United States Patent
Nobumasa et al.

[19]

[11] Patent Number: 6,071,588
[45] Date of Patent: *Jun. 6, 2000

[54] OPTICAL RECORDING MEDIUM

[75] Inventors: Hitoshi Nobumasa; Kunihisa Nagino; Gentaro Ohbay Ashi; Tomoya Yamashiki, all of Shiga-ken; Yuji Watanabe, Kyoto; Takeshi Arai, Shiga-ken, all of Japan

[73] Assignee: Toray Industries, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/991,120

[22] Filed: Dec. 16, 1997

[30] Foreign Application Priority Data

| Dec. 16, 1996 | [JP] | Japan | 8-335453 |
| Mar. 27, 1997 | [JP] | Japan | 9-076048 |
| Jul. 16, 1997 | [JP] | Japan | 9-191493 |

[51] Int. Cl.$^7$ ..................................... B32B 3/02
[52] U.S. Cl. ...................... 428/64.4; 428/64.1; 428/64.5; 428/64.6; 428/64.9; 428/913
[58] Field of Search ................... 428/64.4, 913, 428/64.1, 64.5, 64.6, 64.7, 64.9; 369/13, 48, 275.1, 275.4; 427/576; 430/270.13, 495.1, 945

[56] References Cited

U.S. PATENT DOCUMENTS

| 5,290,609 | 3/1994 | Horiike et al. ........................... 427/576 |
| 5,368,986 | 11/1994 | Terao et al. . |
| 5,470,628 | 11/1995 | Tominaga et al. ...................... 428/64.4 |
| 5,472,758 | 12/1995 | Masahiro et al. . |
| 5,537,373 | 7/1996 | Kenichi . |
| 5,838,646 | 11/1998 | Watanabe et al. ........................ 369/13 |

FOREIGN PATENT DOCUMENTS

| 0 706 176 | 4/1996 | European Pat. Off. . |
| 0 626 679 | 11/1999 | European Pat. Off. . |

OTHER PUBLICATIONS

Ohta et al, Phase Change Disk Media Having Rapid Cooling Structure, Proc. Int. Symp. on Optical Memory, p. 123, 1989.

Ohta et al.: "Accelerated Aging Studies for Phase Change Type Disc Media" Proceedings of The SPIE—Optical Data Storage, vol. 1316, 1990, pp. 367–373, XP 002111561 Vancouver, Canada * p. 367, paragraph 1—p. 368, paragraph 3*.

Patent Abstracts of Japan vol. 014, No. 376 (P–1092), Aug. 14, 1990 & JP 02 139728 A (Sanyo Electric Co Ltd), May 29, 1990 * abstract*.

Lide (Editor): "CRC Materials Science and Engineering Handbook" 1995, CRC Press, Boca Raton, Florida, USA XP 002111562 * pp. 12–191*.

*Primary Examiner*—William Krynski
*Assistant Examiner*—Hong J. Xu
*Attorney, Agent, or Firm*—Morrison & Foerster LLP

[57] ABSTRACT

An optical recording medium has a high hardness layer, first dielectric layer, recording layer, second dielectric layer and reflective layer. The hardness of the high hardness layer is larger than the hardness of the first dielectric layer, and the thickness of the second dielectric layer is in the range of 3 to 50 nm. Such a rewritable phase change type optical recording medium may show reduced degradation in the write-start portion and write-end portion of frequently rewritten sectors, and have good jitter characteristics.

33 Claims, 2 Drawing Sheets

OPTICAL RECORDING MEDIUM

BACKGROUND OF THE INVENTION

1. Field of the Invention

The present invention relates to an optical recording medium with which the recording, erasing, and reproduction of information can be made by irradiation of light.

More particularly, the present invention relates to rewritable phase change type optical recording media such as optical disks, optical cards, optical tapes, etc. from which it is possible to erase and rewrite information. Such recording media may also record information signals at high speed and in high density.

2. Description of the Prior Arts

A conventional rewritable phase change type optical recording medium technique is as noted below.

These optical recording media have recording layers comprising tellurium and the like as main components. To record information, a laser pulse focused on the recording layer of crystallized state is irradiated for a short time to partially melt the recording layer. The molten portion is quenched by thermal diffusion and solidified to form an amorphous state recording mark. The light reflectivity of this recording mark is lower than that of the crystallized state and thus is optically reproducible as a recorded signal.

To erase information, the recording mark portion is irradiated with the laser beam and heated to a temperature lower than the melting point of the recording layer and higher than the crystallizing temperature. As a result the amorphous state recording mark is crystallized to return to the original non-recorded state.

As the materials for these rewritable phase change type optical recording media, there is known for example an alloy of $Ge_2Sb_2Te_5$ or the like (N. Yamada et al., Proc. Int. Symp. on Optical Memory 1987 p61–66).

In these optical recording media having Te alloy as a recording layer, the crystallization speed is fast, and high speed overwriting by circular one-beam is feasible by only modulating the irradiation power. In the optical recording media using these recording layers, typically dielectric layers having heat resistant property and light penetrability are provided, one on each side of the recording layer, to prevent formation of deformations and openings in the recording layer at recording. Furthermore, it is known to provide a metal reflective layer, such as light reflective Al, by lamination on a dielectric layer opposite to the light beam incident direction. This is to improve the signal contrast in reproduction by the optical interference effect.

Difficulties arising with the conventional rewritable phase change type optical recording media as described above are as follows: The conventional disk structure has problems such as degradation of the recording wave forms in the write-start portion and write-end portion of the record in the recording region (hereinafter to be referred to as sector) or aggravation of jitter characteristics by repetition of the rewriting of records (In this regard, as is well known in this field, jitter characteristics concern deviations between a reproduced signal and an original signal for recording). Especially, the aforesaid problems become more significant when adopting a mark length recording which can be formed in high density in place of the conventional pit position recording. One of the causes of this problem may be, shifting of the recording layer to the track direction and radial direction by repetition of rewriting operations. That is, one of the causes is considered to be that, upon repetition of rewriting operations, the recording film gradually shifts forward and/or backward of the track, and the recording film gathers at the starting end and the terminating end of recording, or perhaps the film becomes thinner. Similarly, with respect to the radial direction, it is possible that the recording film at the central part in the track width direction is pushed aside to accumulate on the lateral wall of the track, and that the recording film at the central part in the widthwise direction of the track becomes thin. This is further considered to be a cause of the lowering of the tracking stability arising from repeated rewriting of records.

Furthermore, there has been the problem that, in case of the application of the land/groove recording (in which the higher density recording is feasible), the jitter of the land due to the repetition of rewriting is liable to be more aggravated than that of the groove.

The present invention seeks to provide a rewritable phase change type optical recording medium which shows lower degradation in the write-start portion and/or write-end portion of sectors. The present invention also aims to provide such an optical recording medium for which the characteristics are good.

SUMMARY OF THE INVENTION

The present invention is concerned with an optical recording medium in which recording, erasing, and reproduction of information can be made by irradiating light on the recording layer, and the recording and erasing of information are carried out by the phase change between the amorphous phase and the crystal phase, said recording medium having at least a high hardness layer, first dielectric layer, recording layer, second dielectric layer and reflective layer on a substrate, and wherein the hardness of the high hardness layer is greater than the hardness of the first dielectric layer, and the thickness of the second dielectric layer is 3 to 50 nm.

PREFERRED EMBODIMENTS OF THE INVENTION

Figure 1:
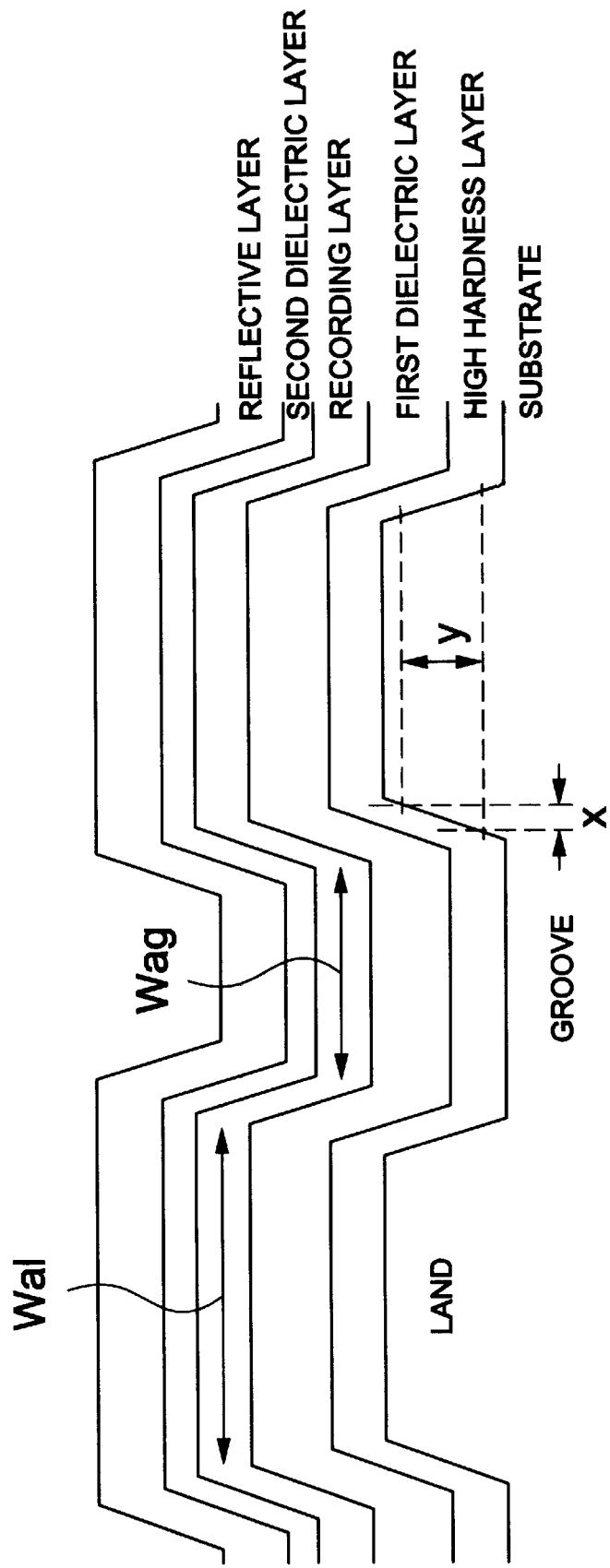
FIG. 1 shows an inclination of the inclined part between the guide groove top and the guide groove bottom, and y/x shows the inclination between the position of 10% from the groove bottom and the position of 10% from the top of the groove.

Embodiments of the present invention are discussed in more detail below, by way of example.

The representative layer constitution of the constituting member of an optical recording medium of the present invention comprises, for example, a laminate of transparent substrate/high hardness layer/first dielectric layer/recording layer/second dielectric layer/reflective layer. However, the constitution is not limited thereto.

In the optical recording medium of the present invention, it is important that the hardness of the high hardness layer is greater than that of the first dielectric layer. That is, by using as a material for the high hardness layer a material having a greater hardness than that of the first dielectric layer, it is possible that movement of the recording film by expansion and contraction attributed to the repeated re-writing of the record can be suppressed. Also degradation in the write-start portion and write-end portion of sectors and aggravation of the jitter characteristics in the repeated re-writing of the record may perhaps be improved. In this respect, the hardness of a layer in an optical recording medium may be defined in terms of its Knoop hardness. Knoop hardness is defined in JIS (Japanese Industrial Standard) Z 2251.

In a rewritable phase change type optical recording medium, there may be provided a protective layer adjacent to the recording layer ZnS—$SiO_2$ dielectric film. However, the Knoop hardness of the ZnS—$SiO_2$ dielectric film is about 400 kg/mm$^2$, and in order to improve the degradation of the write-start portion and write-end portion of sectors and to reduce aggravation of the jitter characteristics in the repeated rewriting of the record, the recording layer should be further protected with the high hardness layer of which the hardness is preferably higher than 450 kg/mm$^2$. In preferred embodiments of the present invention, the high hardness layer has a Knoop hardness of less than 5000 kg/mm$^2$, and most preferably, less than 3000 kg/mm$^2$.

The above composition has desirable effect s especially when applied to an optical recording medium which carries out land groove recording. This is because with said method a large improvement can be made in the repetition characteristics of the jitter of the land caused by repeated re-writing of record. It is difficult to obtain improvement by other methods.

Also, the above composition gives desirable results when applied to an optical recording medium for mark length recording. This is because, in mark length recording, the degradation of the write-start portion and write-end portion of sectors and aggravation of the jitter characteristics in the repeated re-writing of the record become more conspicuous. Thus, the effect of any improvements in these respects should be greater.

In embodiments of the present invention it is preferable for the thermal expansion coefficient of the high hardness layer to be lower than the thermal expansion coefficient of the first dielectric layer. By so doing, with respect to the repetition of the re-writing of the record, fluctuation of the recording layer may be suppressed to a small degree. Also the degradation of the write-start portion and write-end portion of sectors and aggravation of the jitter characteristics may be reduced.

Furthermore, since the high hardness layer may be effective in reducing the thermal load to the recording layer and lessening the thermal damage to the substrate, it is preferable for the high hardness layer to have a greater heat conductivity than the first dielectric layer. If the heat conductivity of the first dielectric layer is large, the heat from the laser light irradiated on the recording layer may be cooled before it is sufficiently effectively utilized for the phase change of the recording layer and sensitivity may be deteriorated, which is not desirable. It is preferable for the heat conductivity of the high hardness layer to be higher than that of the first dielectric layer.

Furthermore, in order to make it easier to take in the incident light, the high hardness layer may preferably be substantially transparent in the recording light wavelength, and its refractive index is preferably also smaller than the refractive index of the first dielectric layer.

Examples of materials suitable for such high hardness layers are the metallic compounds such as metal oxides, metal nitrides, metal carbides, metal sulfates, metal selenides, and mixtures of any of these. As the materials for the high hardness layer, particularly preferred are, for example, the thin films of the oxides of the metals of Si, Ge, Al, Ti, Zr, Ta, Nb, In, Sn, Pb, etc. (e.g., SiOx ($1 \leq x \leq 2$), $Al_2O_3$, $TiO_2$, $Ta_2O_5$, $Nb_2O_3$, MgO, $SrTiO_3$, ITO (Indium-tin oxide), etc.), optical glass (e.g., BK7, wherein the optical glass denotes a mixture of at least more than two kinds selected from the oxides of Si, B, Al, Na, K, Ca, Zn, Ba, Pb, Sb, As, Ti, P, Zr, and La), thin film of nitrides of Si, Al, Ge, Ti, Zr, Ta, Nb, etc. (e.g., $Si_3N_4$, AlN, etc.), thin films of carbides of Si, Ti, Zr, Hf, etc. and the films of the mixtures of these compounds. Also, mixtures of the above with carbon, carbides such as SiC, fluorine compounds such as $MgF_2$ are preferable in view of the small residual stress of film. In view of the film forming rate, material cost, practical utility, etc., it is particularly preferable to emply, as a high hardness layer, a material which contains one or more of: SiOx ($1 \leq x \leq 2$), $Ta_2O_{5-x}$ ($0 \leq x \leq 1$), $Al_2O_{3-x}$ ($0 \leq x \leq 2$), $TiO_{2-x}$ ($0 \leq x \leq 1$), $Nb_2O_{3-x}$ ($0 \leq x \leq 1$), $Si_3N_{4-x}$ ($0 \leq x \leq 2$), AlNx ($0.2 \leq x \leq 1$), ZrOx ($0.5 \leq x \leq 2$), optical glass, etc. It is particularly preferable to employ a high hardness layer which is a film of one of the aforementioned compounds, or which s a mixed film having the same as a main component. In this respect, such a "main" component preferably comprises at least 50 mol % of such a film.

Also, in terms of the durability under high temperature condition or high humidity conditions if the hardness of the high hardness layer is excessively high, the defects such as cracks are possibly liable to occur. This may be due to the effect of the temperature change and by the difference in the physical properties from other constituting layers or substrates. In order to reduce or avoid the occurrence of such defects, with respect to the materials having high hardness in excess of 1000 kg/mm$^2$ in Knoop hardness out of the materials given above, particularly preferable conditions may be $Al_2O_{3-x}$ ($0.2 \leq x \leq 1.5$), $Si_3N_{4-x}$ ($0.5 \leq x \leq 1.5$), AlNx ($0.5 \leq x \leq 0.9$), ZrOx ($0.8 \leq x \leq 1.8$). It is because, by adopting such materials it becomes possible especially to have the configuration flexiblly to adopt to environmental change, without causing substantial lowering of the hardness.

When the high hardness layer of the present invention is formed, either one or more than two of them may be simultaneously formed by vapor deposition, or deposited as a single target.

Having regard to the film forming rate, material cost, practical utility, etc., the high hardness layer is preferably formed by reactive sputtering process. Especially, when the above high hardness layer is formed by using a semiconductor or metal target and DC power source by reactive sputtering process, the apparatus cost can be lowered and the film forming rate can be accelerated, so that in some embodiments such a method is more preferable.

The high hardness layer and first and second dielectric layers of the present invention have the effects to inhibit or prevent the substrate, recording layer, etc. from being deformed by heat, and preferably also to improve the signal contrast in reproducing by the optical interference effect.

For facilitating the optical designing of the disk, it is preferably desirable that at least either one of the refractive index of the high hardness layer or the refractive index of the first dielectric layer is 1.6 or more. It is also preferred that the difference between the refractive index of the second dielectric layer and the refractive index of the high hardness layer is in the range of from −0.2 to 0.2, or the difference between the refractive index of the second dielectric layer and the refractive index of the first dielectric layer is −0.2 to 0.2.

Example materials for the first dielectric layer may be: ZnS thin film, thin films of the oxides of the metals such as Si, Ge, Al, Ti, Zr, Ta, Nb, In, Sn, Pb, etc., thin films of nitrides of Si, Al etc., thin film of carbides such as Ti, Zr, Hf, and films comprising mixtures of any of the above. These are preferable from the point of high heat resistance. Further, their mixtures with the carbides such as carbon, SiC, etc. or fluorides such as $MgF_2$ are also preferable in view of the small residual stress of the resultant film. Especially for some embodiments, it is preferable to use a film comprising a mixture of ZnS and $SiO_2$ which is substantially transparent to the recording light wavelength, and has a refractive index larger than the refractive index of the transparent substrate and smaller than the refractive index of the recording layer. Also, for some embodiments as absorbing light and being efficiently usable as thermal energy for recording and erasing, it is also preferable for the film to be formed of non-transparent material. For example, a mixture of ZnS, $SiO_2$ and carbon is preferable because of the small residual stress of film and, even after repeated recording and erasing, less tendency to show degradation in recording sensitivity, in carrier to noise ratio (C/N), in erasing rate, etc.

The thickness of the high hardness layer is desirably thinner than the thickness of the first dielectric layer, and is preferably more than 10 nm. When it is thinner than 10 nm, the effect of the provision of high hardness layer might not be obtained so readily, cracks may be formed in the high hardness layer, and rather ill effects may be exerted on the repetition durability. In order to obtain sufficient effect of high hardness layer on the repeated rewriting of records, the thickness is preferably more than 25 nm, and more preferably more than 35 nm. Further, in order to exhibit the optical characteristics of the first dielectric layer sufficiently, the thickness of the high hardness layer is desirably thinner than the thickness of the first dielectric layer. If the high hardness layer is too thick, the high hardness layer may cause cracks by repetition of recording, which may be detrimental to the repetition durability. Also, an increase in the thickness of the high hardness layer results in increased manufacturing cost. Also, in view of the preferred range of the total of the thickness of the high hardness layer and the first dielectric layer as described later, in preferred embodiments of the invention the thickness of the high hardness layer is desirably no more than 100 nm, and from the point of optical designing, preferably no more than 50 nm, and more preferably no more than 45 nm.

The thickness of the high hardness layer and the first dielectric layer is determined by optical conditions. The total thickness of the two is preferably approximately 10 nm–500 nm. In terms of reducing the tendency for release from the substrate or recording layer and reducing defects to be caused such as cracks, the thickness is preferably from 50 up to and including 400 nm, more preferably 80 to 200 nm.

A mixed layer comprising the high hardness layer material and the first dielectric layer material may be placed between the high hardness layer and the first dielectric layer. By so doing, there can be obtained an optical recording medium which has excellent contact property between the high hardness layer and the first dielectric layer, and especially excellent long term preservation stability.

The material of the second dielectric layer of the present invention may be similar to those listed as the materials suitable for the high hardness layer or the first dielectric layer, or material of some other kind may be employed. For example, the material for the second dielectric layer may be selected from the metal compounds of metal sulfides, metal oxides, metal nitrides, metal carbides, metal selenides such as ZnS, $SiO_2$, aluminum oxide, silicon nitride, ZrC, ZnSe, etc., and their mixtures. Although these transparent materials may be used, formation with non-transparent material is more preferable. With this layer, the light can be absorbed and used effectively as thermal energy for recording and erasing.

With respect to the particular example materials for the second dielectric layer, a thin film of ZnS, a thin film of oxides of metals such as Si, Ge, Al, Ti, Zr, Ta, Nb, etc., a thin film of nitrides such as Si, Al, a thin film of carbides such as Ti, Zr, Hf, etc. and film(s) comprising mixtures of these compounds are preferable in terms of high heat resistance. Also, the mixtures of them with the carbides such as carbon, SiC, etc. and fluorides such as $MgF_2$ are preferable from the point of small residual stress of the film. Especially, a mixed film of ZnS and $SiO_2$ or mixtures of ZnS, $SiO_2$ and carbon are preferable because deterioration in the recording characteristics by repetition is less liable to occur.

The thickness of the second dielectric layer is required to be in the range of 3 to 50 nm. When the thickness of the second dielectric layer is thinner than the above, defects such as cracks occur and repetition durability may be lowered, and this is not desirable.

A second dielectric layer which is thicker than the above range is not desirable because the cooling rate of the recording layer is lowered. The thickness of the second dielectric layer has more directly a large effect on the cooling of the recording layer, and in order to obtain better erasing characteristic or repetition durability, or especially to obtain favourable recording and erasing characteristics in the mark length recording, the thickness of preferably 30 nm or less is more effective.

As the recording layer materials, there is no special limitation, but examples are In—Se alloy, Ge—Sb—Te alloy, In—Sb—Te alloy, Pd—Ge—Sb—Te alloy, Pt—Ge—Sb—Te alloy, Nb—Ge—Sb—Te alloy, Ni—Ge—Sb—Te alloy, Co—Ge—Sb—Te alloy, Ag—In—Sb—Te alloy, Pd—Nb—Ge—Sb—Te alloy, etc.

Especially, Ge—Sb—Te alloy, Pd—Ge—Sb—Te alloy, Pt—Ge—Sb—Te alloy, Nb—Ge—Sb—Te alloy, and Pd—Nb—Ge—Sb—Te alloy are preferable because of the short erasing time, possibility to repeat recording and erasing for many times, and excellent recording characteristics such as C/N, erasing rate, etc.

The thickness of the recording layer of the present invention is preferably between 5 nm and 40 nm. When the thickness of the recording layer is thinner than the above range, degradation of recording characteristics by repeated overwriting may arise. When the thickness of the recording layer is thicker than the above range, movement of the recording layer may be liable to occur by repeated overwriting, and jitter aggravation may become severe. Especially, in case of adopting the mark length recording, movements of the recording layer by recording and erasing are possibly liable to occur in comparison with the case of the pit position recording. In order to prevent this phenomenon, cooling of the recording layer in recording is required to be made larger. The thickness of the recording layer is thus preferably 10 to 35 nm, more preferably 10 to 24 nm, and most preferably 16 to 24 nm.

With respect to the material quality of the reflective layer, there can be exemplified a metal having light reflective property, alloy, and mixture of metal with metal compound, etc. As the metal, high reflectivity metals such as Al, Au, Ag, Cu, etc. as an alloy, the alloy containing more than 80 atomic percent of them as the main component and containing the additive elements such as Ti, Te, Cr, Hf, etc., and as metal compound, the metal compounds including the metal nitrides, metal oxides, metal chalcogen compounds etc. such as Al, Si are preferable.

The metals such as Al, Au, etc. and alloys having these as the main components are preferable in view of the high light reflective property and the possibility to make the thermal conductivity higher. As the examples of the aforedescribed alloys, there are ones incorporated with 0.5 to 5 atomic % in total of at least one element of Si, Mg, Cu, Pd, Ti, Cr, Hf, Ta, Nb, Mn, etc. to Al, or ones incorporated with 1 to 20 atomic % in total of at least one element of Cr, Ag, Cu, Pd, Pt, Ni, etc. to Au. Especially, in view of the possibility to make the material cost low, the alloy having Al as the main component is preferable.

Especially, as the Al alloy, because of the good corrosion resistance, an alloy made by adding 0.5 to 5 atomic % in total of at least one kind selected from Ti, Cr, Ta, Hf, Zr, Mn, and Pd to Al, or by adding Si and Mn of no more than 5 atomic % in total to Al, is preferable.

Especially, in view of the points of high corrosion resistance, high thermal stability, and less liability for generating hillocks, etc., it is desirable to constitute the reflective layer of which main component is any one of the Al—Hf—Pd alloy, Al—Hf alloy, Al—Ti alloy, Al—Ti—Hf alloy, Al—Cr alloy, Al—Ta alloy, Al—Ti—Cr alloy, and Al—Si—Mn alloy, and including less than 3 atomic % in total of the addition elements.

The thickness of the reflective layer is normally preferably in the range of about 10 nm to 300 nm. In order to make it possible to obtain high recording sensitivity and large reproducing signal intensity, the thickness is preferably in the range of 20 nm to 200 nm.

Further, with the tendency to adopt high linear velocity and high density, and depending on the condition of the recording film prior to overwriting being the crystal phase or amorphous phase, at the time of the overwriting, recording mark distortion may result. In such a case, with the main object of adjusting the light absorption amount between the case of the recording film being in the crystal phase and the case of it being in the amorphous phase, there may be formed between the reflective layer and the second dielectric layer an absorbing amount correction layer comprising the high melting point carbide, oxide, borate, nitride, containing Ti, Zr, Hf, Cr, Ta, Mo, Mn, W, Nb, Rh, Ni, Fe, Pt, Os, Co, Zn, Pd, Si or alloys of them, Ti, Nb, Mo or Te as essential components and the mixture of them, in the thickness of the layer capable of partially absorbing or transmitting light.

In some embodiments, the recording layer, second dielectric layer and reflective layer are preferably provided adjacent to one another without intervening any other layer between them, in order to obtain better erasing characteristics and repetition durability. Especially, when a layer thicker than the second dielectric layer is provided between those layers, jitter aggravation by repetition of rewriting of records may increase, particularly in the case of the mark length recording.

Because the recording sensitivity is high, single beam overwriting is possible at high speed, erasing rate is large, erasing characteristics are good, and degradation of start-writing portion and end-writing portion of record by repetition of rewriting of record is less, and jitter aggravation is small, it is preferable to constitute the principal part of the optical recording medium as follows:

That is to say, it is particularly preferable to constitute the high hardness layer with a film selected from $SiOx$ ($1 \leq x \leq 2$), $Si_3N_{4-x}$ ($0 \leq x \leq 2$), $Ta_2O_{5-x}$ ($0 \leq x \leq 1$), $Al_2O_{3-x}$ ($0 \leq x \leq 2$), $AlNx$ ($0.2 \leq x \leq 1$), and $ZrOx$ ($0.5 \leq x \leq 2$), or a mixed having them as the main components, i.e. the mixed film comprises at least 50 wt % of them, the first dielectric layer is a mixed film of ZnS and $SiO_2$ with the mixing ratio of $SiO_2$ being 15 to 35 mol %, or a mixed film of ZnS and $SiO_2$ with carbon, and using as a recording layer an alloy containing at least the elements of Ge, Sb, and Te, and the second dielectric layer is a mixed film of ZnS and $SiO_2$ with the mixing ratio of $SiO_2$ being 15 to 35 mol %, or a mixed film of ZnS and $SiO_2$ with carbon, and the second dielectric layer thickness is constituted in the range of 3 nm to 50 nm, and the recording layer thickness in the range of 5 nm to 40 nm. Especially, the recording layer composition is preferably in the range as represented by the following expressions:

$$(M_x Sb_y Te_{1-x-y})1 - z(Te_{0.5} Ge_{0.5})_z$$

$$0 \leq x \leq 0.05$$

$$0.35 \leq y \leq 0.65$$

$$0.2 \leq z \leq 0.5$$

where, M represents at least one metal selected from palladium, niobium, platinum, silver, gold, and cobalt; and x, y, z and numerals represent the atomic number ratios of the respective elements (molar ratios of the elements). Also, it is preferable for the Al alloy to be constituted as a reflective layer in a thickness of 20 nm–200 nm on the second dielectric layer of the above constitution.

As the materials for the substrate of the present invention, various transparent synthetic resins, transparent glass, etc. are usable. With the object of avoiding the effects of dust or damage of substrate, preferably a transparent substrate is used and recording is made with the focused light beams from the substrate side. As the materials for such transparent substrate there may be exemplified glass, polycarbonate, polymethyl methacrylate, polyolefin resin, epoxy resin, polyimide resin, etc.

Especially, due to the small optical birefringency, small moisture absorbability, and easy molding, polycarbonate resin and amorphous polyolefin resin are preferable. In case the heat resistance is required, use of epoxy resin is preferable.

The thickness of the substrate is not specifically limited, but in practice is preferably 0.01 mm–5 mm. When the thickness is less than 0.01 mm, even when recording with the light beams focused from the substrate side, the substrate is liable to be effected by dust, whereas when the thickness is more than 5 mm, it becomes difficult to adopt a large aperture for the objective lens, and as the projection light beam spot size becomes large, it is difficult to increase the recording density. Particularly preferred range is 0.4 mm–1.2 mm. The substrate may be a flexible one or rigid one. The flexible substrate is used in a tape form, sheet form, or card form. The rigid substrate may be used in a card form or a disk form. The substrate may be provided with a recording layer and the like, after which it may be held between the two substrates in an air sandwich structure, air incident structure, or in closely sticking structure, for example.

In case of making a land groove recording, the configuration of the optical recording medium is preferably as follows:

The inclination of the slope portion between the guide groove and the guide land of the optical recording medium is preferably between 0.15 and 1.8, wherein the inclination of the slope portion between the guide groove and the guide land indicates the inclination y/x between the position of 10% from the bottom of the groove and the position of 10% from the top of the groove, as shown in FIG. 1. As the geometric relations are different between the land and the groove, the land shows the larger heat radiation, and when recordings are made in the same manner in the land and the groove, the land tends to show the smaller or indistinct mark. However, by making the inclination of the slope portion more than 0.15, the difference of thermal diffusion between the land and the groove in recording can be made smaller. Also, normally, the substrate is made by pressing and shaping with a mold having a groove called stamper. When the inclination of the slope part exceeds 1.8, release from mold in shaping may tend to become unsatisfactory and good substrate might not be obtained. The inclination is preferably 0.25 to 1.0, and more preferably 0.3 to 0.7, in consideration of the margin of manufacture. In this manner, by making the inclination angle large to a degree not to affect the release from mold in molding, durability against cross-erasing can be improved.

Also, the fluidity of the recording layer by the repetition of rewriting in land and groove is considered to be the cause for disturbing the tracking. In case of the wobble of the groove and the land (wobble denotes to undulate the groove and the land so as to detect the position information), this phenomenon is amplified further, so that the wobble width is preferably small in the range in which the wobble signal can be detected, which is preferably in the range of 1 to 10%, more preferably 2 to 8%, of the width of the groove and the land.

Also, the width of the inclined part between the groove and the land being no more than 25% of the track pitch is preferable, because when the groove comes to have a shape close to a rectangle, it shuts the heat in recording at the slope portion and improves the cross erasing durability. However, when the width of the inclined part between the groove and the land is less than 3% of the track pitch, in the same manner as in the case of the excessively large inclination angle, the substrate can be less easily released from the stamper in molding the substrate. Therefore, the width of the inclined part between the groove and the land is preferably in the range of 3 to 25%.

Furthermore, in the optical recording medium of the present invention, it is possible to decrease the crosstalk to make the difference in the recording characteristics between the land and the groove small, and it is preferable to make the groove depth an optical path length of 1/7 to 1/5 of the wavelength of the reproduced light. In case of the optical path length having the groove depth less than 1/7 or exceeding 1/5 of the wavelength of the reproduced light, the crosstalk becomes large to make accurate reproduction difficult.

Furthermore, in view of the reduction in cross erasing and high density recording, the track pitch (Tp) of the present invention is preferably in the following range:

Tp=a.$\lambda$/NA ($\lambda$ is recording and reproducing light wavelength, and NA is lens aperture number)

$0.9 \leq a \leq 1.5$

Also, the ratio of the flat portions of the land and the groove to the track pitch is preferably between 0.4 and 0.6, in the light of reducing the amplitude difference of the reproduced signals between the land and the groove. After all, the preferred conditions are that the track pitch is in the range of $\lambda$/NA to 1.5$\lambda$/NA and the ratio of the flat portions of land to groove is preferably 0.4 to 0.6, by which the recording characteristics of the land and the groove can be leveled in high density recording.

Further, in order to correct the differences in the reproduction signal owing to the differences in the thermal environments between the land and the groove, and further, in order to prevent movement of recording layer by wobble and aggravation of tracking at the time of repetition of recording and erasing on the wobbled land or groove, and further, in order to take the large reproduced signal amplitude, to prevent generation of cross erasing, to reduce crosstalk, it is preferable to make beforehand the land width and groove width in the recording layer, and width of the record mark, (Wag−Ww)/2 $\leq$ Wmg $\leq$ Wag−Ww, and (Wal−Ww)/2 $\leq$ Wml $\leq$ Wal−Ww.

In the above, the groove width in the recording layer: Wag, width of the land in the recording layer: Wal, wobble width of land and groove: Ww, width of the record mark recorded on the groove: Wmg, width of the record mark recorded on the land: Wml.

Figure 2:
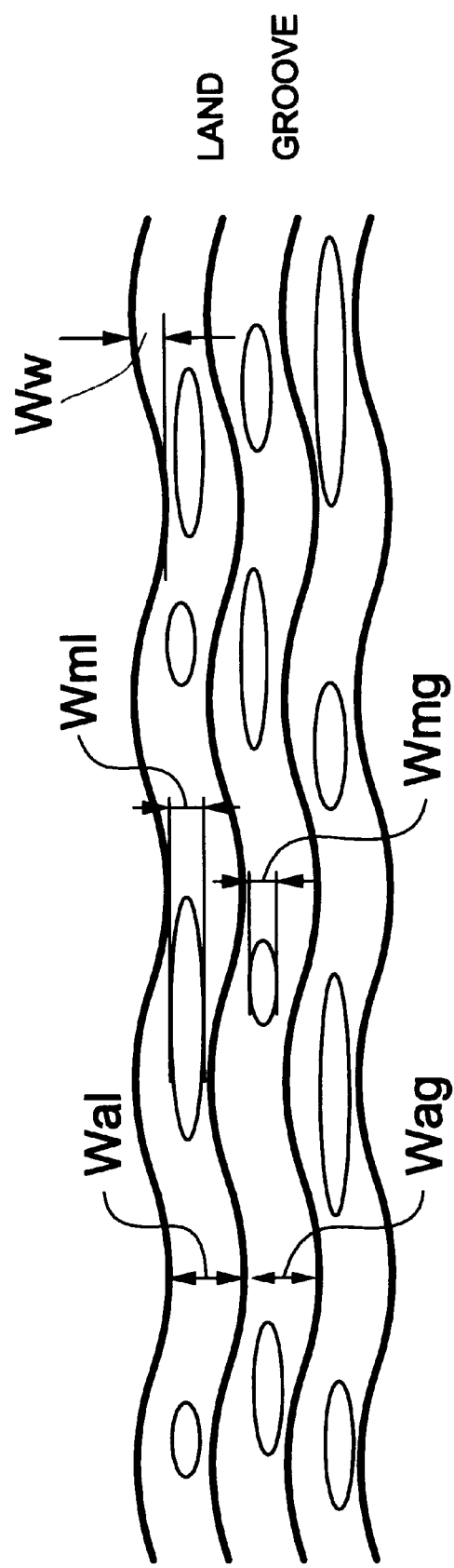
FIG. 2 is an enlarged planar view of a recording region and shows the relationship between the width of the wobble and the land, and between the groove width and land and the recording mark recorded on the groove, wherein width of the groove in the recording layer: Wag width of the land in the recording layer: Wal wobble width of land and groove: Ww width of recording mark recorded in the groove: Wmg width of recording mark recorded in the land: Wml

The relations between the wobble width and the land and groove widths and the record mark width recorded in the land and groove are shown in FIG. 2. When the recording mark is in the above preferred range, residual erasing or movement of recording layer by repetition of rewriting is less likely to have the effect of wobble, and this is preferable. When the signal strength in reproduction is taken into account, the relations are more preferably:

0.5×(Wag−Ww) $\leq$ Wmg $\leq$ 0.9×(Wag−Wg) and 0.5×(Wal−Ww) $\leq$ Wml $\leq$ 0.9×(Wal−Ww).

The light source to be used for recording the optical recording medium of the present invention is generally a high intensity light source such as laser beam, stroboscopic light, and especially a semiconductor laser beam is preferable owing to its small consumptive power and easy modulation.

Recording is made by irradiating laser beam pulses onto the recording layer in a crystal state to form amorphous recording mark. Conversely, a crystalline recording mark may be formed on a recording layer in an amorphous state. Erasing may be effected by laser beam irradiation to crystallize the amorphous recording mark or to convert the crystalline recording mark into an amorphous state, as appropriate. For convenience in making the high speed recording and in reducing liability of deformation of recording layer, it is preferable to adopt a method of forming an amorphous recording mark in recording and carrying out crystallization in erasing. Also, a one-beam overwriting method, in which the light intensity is made high in forming the recording mark and it is made slightly weaker in erasing, so that the rewriting is made by one time light beam irradiation, is preferable in view of reducing the time required for rewriting.

Next, the manufacturing method for the optical recording medium of the present invention is described. With respect to the method for forming the high hardness layer, first dielectric layer, recording layer, second dielectric layer, reflective layer, etc. on a substrate, there are given the thin film forming methods in vacuum such as vacuum deposition, ion plating, sputtering, etc. Especially, in view of the facility to control composition and film thickness, sputtering method is preferable.

Control of thickness of the recording layer to be formed can be easily made by monitoring the deposition condition with a crystal oscillator film thickness gauge or the like.

Formation of the recording layer and the like may be made under conditions of the substrate being fixed or shifted or rotated, for example. Due to the excellent uniformity in the film thickness surface, preferably the substrate is caused to make autorotation, which is preferably combined with revolution.

Furthermore, without deteriorating the effect of the present invention, dielectric layers of ZnS, $SiO_2$, ZnS—$SiO_2$, etc. or protective layers of ultraviolet cured resin, etc. may be provided to prevent damage or deformation, after forming the reflective layer, according to necessity. The substrate may be provided with a hub or the like, according to necessity. Furthermore, after forming a reflective layer, or further after forming the above resin protective layer, the two substrates may be fixed together with an adhesive. The recording layer is preferably crystallized by irradiating the light of laser beam, xenon flash lamp, etc. before actual recording.

EXAMPLES

Hereinafter, embodiments of the present invention are described by way of the examples.
Analysis and Measurement Methods The compositions of the reflective layer and recording layer are confirmed by ICP luminous analyzer [made by SEIKO Electronics Industry Co.]. Jitter is measured by the time interval analyzer. The deterioration distance (collapse of waveform) between the start-writing portion and the end-writing portion of the record region is observed by a cathode ray oscilloscope.

The film thickness during the formation of the recording layer, dielectric layer, and reflective layer is monitored by the quartz oscillator film thickness gauge. The thickness of each layer is measured by observing the cross section with a scanning type or transmission type electron microscope. The refractive ratio is measured by 680 nm. Knoop hardness is determined in accordance with JIS Z 2251.

Example 1

A polycarbonate substrate with a spiral groove with a thickness of 0.6 mm, diameter of 12 cm, and a pitch of 1.48 μm (land width 0.74 μm, groove width 0.74 μm, groove depth 72 nm) was revolved at 30 r.p.m. to form a high hardness layer, a dielectric layer, a recording layer, and a reflective layer by high frequency sputtering. The detailed parameters of the substrate used in this example are shown in Table 10.

At first, the vacuum vessel was evacuated to $1\times10^{-3}$ Pa, after which the $SiO_2$ target was sputtered in an Ar gas atmosphere of $2\times10^{-1}$ Pa to form a 35 nm high hardness layer on a substrate. Further, the ZnS incorporated with 20 mol % of $SiO_2$ was sputtered to form a first dielectric layer having the film thickness of 95 nm.

The Knoop hardness of $SiO_2$ was 550, and refractive index was 1.5. The Knoop hardness of $ZnS.SiO_2$, which is the first dielectric layer, was 400, and the refractive index was 2.1.

The coefficient of thermal conductivity of $ZnS.SiO_2$ is 0.6 (W/m.K), and coefficient of thermal expansion is 6.1 ($\times10^{-6}$/K). The coefficient of thermal conductivity and coefficient of thermal expansion of $SiO_2$ which is the high hardness layer are respectively 1.5 (W/m.K) and 0.5 ($\times10^{-6}$/K).

Continued to the above, an alloy target comprising Ge, Sb, and Te is sputtered to obtain a recording layer comprising the composition of $Ge_{0.185}Sb_{0.279}Te_{0.536}$. Further, with the same material as the first dielectric layer, the second dielectric layer is formed by 16 nm, on which an alloy of $Al_{98.1}Hf_{1.7}Pd_{0.2}$ is sputtered to form a reflective layer having a film thickness of 150 nm to obtain an optical recording medium of the present invention.

On said optical recording medium the recording layer of the whole disk surface is crystallized by the semiconductor laser beam having a wavelength of 830 nm and initialized.

Next, under the conditions of the linear velocity of 6 m/sec., using the optical head having the aperture number of 0.6 of objective lens, and semiconductor laser wavelength of 680 nm, 8/16 modulation random pattern is overwritten by the mark length recording for 100,000 times. At this time, as a recording laser waveform, a normally used multi-pulse is used. The window width at this time is 34 ns. The recording power and erasing power are 10.0 mW and 4.8 mW, respectively.

In case of the overwriting, the writing start position and the writing end position of the data (recording mark) are fixed to a point on the disk. Also, the distance between the starting portion and the ending portion in data writing is set to be 1 cm, and said portion only is to be overwritten.

On observation of the collapse of waveforms at the starting portion and the ending portion in data writing after overwriting for 100,000 times, the results are 3 μm and 1 μm, respectively, and they are confirmed to be practically acceptable. Further, on measurement of the jitter on the related portion, the amount is confirmed to be 9% of the window width which is sufficiently small for practical use.

Further, except that the recording is made repeatedly for 100,000 times on the land instead of the groove, similar measurements to the above are made and the collapses of the waveforms at the starting portion and the ending portion in data writing are observed to be 10 μm and 0 μm, respectively, and they are confirmed to be practically acceptable. Further, on measurement of the jitter on the related portion, the amount is confirmed to be 9.5% of the window width which is sufficiently small for practical use.

Example 2

Except that an alloy target comprising Ge, Sb, and Te is sputtered to make a recording layer comprising $Ge_{0.207}Sb_{0.257}Te_{0.536}$, there is prepared a disk similar to that of Example 1.

Taking measurements similar to those of Example 1, the collapse of waveforms at the starting portion and the ending portion in data writing after overwriting of groove for 100,000 times are 5 μm and 1 μm, respectively, which are confirmed to be sufficiently small practically. Further, the jitter on the related portion is confirmed to be 9.5% of the window width which can be confirmed to be sufficiently small for practical use.

Also, the collapse of waveforms at the starting portion and the ending portion in land after overwriting for 100,000 times are 15 μm and 0 μm, respectively, which are confirmed to be sufficiently small practically. Further, the jitter on the related portion is 10.0% of the window width, which is confirmed to be sufficiently small for practical use.

Example 3

Except that an alloy target comprising Pd, Nb, Ge, Sb, and Te is sputtered to make a recording layer comprising $Nb_{0.003}Pd_{0.002}Ge_{0.185}Sb_{0.27}Te_{0.54}$ having a film thickness of 20 nm, there is prepared a disk similar to that of Example 1.

Taking measurements similar to those of Example 1, the collapse of waveforms at the starting portion and the ending portion in groove after overwriting for 100,000 times are 2 μm and 0 μm, respectively, which are confirmed to be sufficiently small practically. Further, the jitter on the related portion is 9.0% of the window width which is confirmed to be sufficiently small for practical use.

Also, the collapse of waveforms at the starting portion and the ending portion in land after overwriting for 100,000 times are 5 μm and 5 μm, respectively, which are confirmed to be sufficiently small practically. Further, the jitter on the related portion is 10.5% of the window width, which is confirmed to be sufficiently small for practical use.

Example 4

Except that a high hardness layer comprising $(SiO_2)_{97}C_3$ is made by simultaneously sputtering the $SiO_2$ target and the C (carbon) target, a disk similar to that of Example 1 is obtained. The Knoop hardness of the high hardness layer at the time is 500, and the refractive index is 1.5. The coefficient of thermal conductivity and coefficient of thermal expansion are 1.2 (W/m.K) and 0.8 ($\times 10^{-6}$/K), respectively.

Taking measurements similar to those of Example 1, the collapse of waveforms at the starting portion and the ending portion in groove after overwriting for 100,000 times are 5 μm and 1 μm, respectively, which are confirmed to be sufficiently small. Further, the jitter on the related portion is 9.0% of the window width which is confirmed to be sufficiently small for practical use.

Also, the collapse of waveforms at the starting portion and the ending portion in land after overwriting for 100,000 times are 7 μm and 4 μm, respectively, which are confirmed to be sufficiently small practically. Further, the jitter on the related portion is 9.0% of the window width which is confirmed to be sufficiently small for practical use.

Example 5

Except that a high hardness layer comprising the optical glass "BK3" is made, a disk similar to that of Example 1 is obtained. The Knoop hardness of the high hardness layer at the time is 580, and the refractive index is 1.5. The coefficient of thermal conductivity and coefficient of thermal expansion are 1.0 (W/m.K) and 5.8 ($\times 10^{-6}$/K), respectively.

Taking measurements similar to those of Example 1, the collapse of waveforms at the starting portion and the ending portion in groove after overwriting for 100,000 times are 5 μm and 3 μm, respectively, which are confirmed to be sufficiently small. Further, the jitter on the related portion is 10.0% of the window width which is confirmed to be sufficiently small for practical use.

Also, the collapse of waveforms at the starting portion and the ending portion in land after overwriting for 100,000 times are 5 μm and 10 μm, respectively, which are confirmed to be sufficiently small practically. Further, the jitter on the related portion is 9.5% of the window width, which is confirmed to be sufficiently small for practical use.

Example 6

Except that a high hardness layer comprising $Si_3N_4$ is made and the thickness of the first dielectric layer is set as 65 nm, a disk similar to that of Example 1 is obtained. The Knoop hardness of the high hardness layer at the time is 1900, and the refractive index is 2.0. The coefficient of thermal conductivity and coefficient of thermal expansion are 18 (W/m.K) and 5.7 ($\times 10^{-6}$/K), respectively.

Taking measurements similar to those of Example 1, the collapse of waveforms at the starting portion and the ending portion in groove after overwriting for 100,000 times are 6 μm and 2 μm, respectively, which are confirmed to be sufficiently small. Further, the jitter on the related portion is 9.5% of the window width which is confirmed to be sufficiently small for practical use.

Also, the collapse of waveforms at the starting portion and the ending portion in land after overwriting for 100,000 times are 15 μ and 3 μm, respectively, which are confirmed to be sufficiently small practically. Further, the jitter on the related portion is 10.5% of the window width which is confirmed to be sufficiently small for practical use.

Example 7

Except that a high hardness layer comprising $Ta_2O_5$ is made, a disk similar to that of Example 6 is obtained. The Knoop hardness of the high hardness layer at the time is 580, and the refractive index is 2.0. The coefficient of thermal conductivity and coefficient of thermal expansion are 12.9 (W/m.K) and 4.9 ($\times 10^{-6}$/K), respectively.

Taking measurements similar to those of Example 1, the collapse of waveforms at the starting portion and the ending portion in groove after overwriting for 100,000 times are 5 μm and 1 μm, respectively, which are confirmed to be sufficiently small. Further, the jitter on the related portion is 9.5% of the window width which is confirmed to be sufficiently small for practical use.

Also, the collapse of waveforms at the starting portion and the ending portion in land after overwriting for 100,000 times are 20 μm and 8 μm, respectively, which are confirmed to be sufficiently small practically. Further, the jitter on the related portion is 10.5% of the window width which is confirmed to be sufficiently small for practical use.

Example 8

Except that a high hardness layer comprising $Al_2O_3$ is made, a disk similar to that of Example 6 is obtained. The Knoop hardness of the high hardness layer at the time is 1900, and the refractive index is 1.8. The coefficient of thermal conductivity and coefficient of thermal expansion are 40 (W/m.K) and 5.3 ($\times 10^{-6}$/K), respectively.

Taking measurements similar to those of Example 1, the collapse of waveforms at the starting portion and the ending portion in groove after overwriting for 100,000 times are 6 μm and 1 μm, respectively, which are confirmed to be sufficiently small. Further, the jitter on the related portion is 9.0% of the window width which is confirmed to be sufficiently small for practical use.

Also, the collapse of waveforms at the starting portion and the ending portion in land after overwriting for 100,000 times are 8 μm and 0 μm, respectively, which are confirmed to be sufficiently small practically. Further, the jitter on the related portion is 9.5% of the window width which is confirmed to be sufficiently small for practical use.

Example 9

Except that a high hardness layer comprising AlN is made, a disk similar to that of Example 6 is obtained. The Knoop hardness of the high hardness layer at the time is 1500, and the refractive index is 1.9. The coefficient of thermal conductivity and coefficient of thermal expansion are 24.5 (W/m.K) and 4.0 ($\times 10^{-6}$/K), respectively.

Taking measurements similar to those of Example 1, the collapse of waveforms at the starting portion and the ending portion in groove after overwriting for 100,000 times are 4 μm and 2 μm, respectively, which are confirmed to be sufficiently small. Further, the jitter on the related portion is 10.0% of the window width which is confirmed to be sufficiently small for practical use.

Also, the collapse of waveforms at the starting portion and the ending portion in land after overwriting for 100,000 times are 15 μm and 8 μm, respectively, which are confirmed to be sufficiently small practically. Further, the jitter on the related portion is 9.5% of the window width which is confirmed to be sufficiently small for practical use.

Example 10

Except that an Si target is subjected to DC sputtering in a gas atmosphere of $Ar:N_2=1:1$ to form an $Si_3N_4$ high hardness layer of 35 nm (Knoop hardness=1900) on a substrate, a disk similar to that of Example 6 is obtained.

Taking measurements similar to those of Example 1, the collapse of waveforms at the starting portion and the ending portion in groove after overwriting for 100,000 times are 6 μm and 2 μm, respectively, which are confirmed to be sufficiently small. Further, the jitter on the related portion is 9.5% of the window width which is confirmed to be sufficiently small for practical use.

Also, the collapse of waveforms at the starting portion and the ending portion in land after overwriting for 100,000 times are 10 μm and 5 μm, respectively, which are confirmed to be sufficiently small practically. Further, the jitter on the related portion is 9.0% of the window width which is confirmed to be sufficiently small for practical use.

Example 11

Except that a high hardness layer comprising $ZrO_2$ is made, a disk similar to that of Example 6 is obtained. The Knoop hardness of the high hardness layer at the time is 1600, and the refractive index is 2.0. The coefficient of thermal conductivity and coefficient of thermal expansion are 3.1 (W/m.K) and 5.9 ($\times 10^{-6}$/K), respectively.

Taking measurements similar to those of Example 1, the collapse of waveforms at the starting portion and the ending portion in groove after overwriting for 100,000 times are 4 μm and 2 μm, respectively, which are confirmed to be sufficiently small. Further, the jitter on the related portion is 10.0% of the window width which is confirmed to be sufficiently small for practical use.

Also, the collapse of waveforms at the starting portion and the ending portion in land after overwriting for 100,000 times are 12 μm and 10 μm, respectively, which are confirmed to be sufficiently small practically. Further, the jitter on the related portion is 10.5% of the window width which is confirmed to be sufficiently small for practical use.

Example 12

On a substrate, a high hardness layer comprising $SiO_2$ is made in 35 nm (Knoop hardness=550). Further, a Ge target is subjected to DC sputtering in a gas atmosphere of Ar:$O_2$=1:1 to make a first dielectric layer of 90 nm GeOx (X=1) first dielectric layer on a substrate. The Knoop hardness of the first dielectric layer is 450, and the refractive index is 2.1. The coefficient of thermal conductivity and coefficient of thermal expansion are 1.0 (W/m.K) and 7.6 ($\times 10^{-6}$/K), respectively. Subsequently, a recording layer similar to that of Example 3 is formed, and further, as the second dielectric layer, 20 nm of $SiO_2$ is formed. Thereafter, a reflective layer similar to that of Example 3 is formed to obtain the objective optical recording medium. On practice of measurements similar to those of Example 1, approximately the same results as those of Example 1 are obtained.

Example 13

Except that the four level high hardness layers of $Si_3N_{2.0}$, $Si_3N_{2.6}$, $Si_3N_{3.4}$, $Si_3N_{4.0}$, are made by using a mixed gas of Ar and $N_2$ by Si reactive sputtering, there are obtained the disks similar to those of Example 6. The composition ratios of Si to N are varied by changing the flow ratio of Ar to $N_2$. The compositions of the prepared high hardness layers are confirmed by NRA (Nuclear Reaction Analysis) process. The Knoop hardness and refractive indices of the high hardness layers at the time are of the values as shown in Table 1.

The determinations similar to those of Example 1 are given to the four disks having different compositions to observe the collapse of waveforms at the starting portion and the ending portion of writing in groove after overwriting for 100,000 times. The jitter measurements are also made. The results as shown in Table 1 are obtained.

It is known from these results that all of these four levels show good initial characteristics. Next, these materials are charged in an oven at 90° C. and 80% RH and kept for 500 hours. Thereafter, the specimens are returned to room temperature and are subjected to waveform observation. As a result, it is known that some show defects which are presumed to be attributed to the partial release of the constituting layers in the recording signals (burst defect). The results are shown in Table 1. As a result, it is apparent that $Si_3N_{2.5-3.5}$ show favorable characteristics from the durability point of view.

TABLE 1

| Composition of high hardness layer | Waveform collapse at start of writing | Waveform collapse at end of writing | Jitter (vs. window width) | Number of bursting defects (per 50 cm² of record region) | Hardness | Refraction index |
|---|---|---|---|---|---|---|
| $Si_3N_{2.0}$ | 6.4 μm | 2.8 μm | 9.7% | 2 | 1750 | 2.2 |
| $Si_3N_{2.6}$ | 6.1 μm | 2.5 μm | 9.6% | 0 | 1840 | 2.1 |
| $Si_3N_{3.4}$ | 5.9 μm | 2.4 μm | 9.4% | 0 | 1860 | 2.0 |
| $Si_3N_{4.0}$ | 6.2 μm | 2.5 μm | 9.4% | 1 | 1900 | 2.0 |

Example 14

Except that the four level high hardness layers of $Al_2O_{1.2}$, $Al_2O_{1.6}$, $Al_2O_{2.7}$, $Al_2O_{3.0}$, are made by using a mixed gas of Ar and $O_2$ by Al reactive sputtering, there are obtained the disks similar to those of Example 6. The composition ratios of Al to O are varied by changing the flow ratio of Ar to $O_2$. The compositions of the prepared high hardness layers are confirmed by RBS (Rutherford Backward Scatterings) process.

The determinations similar to those of Example 1 are given to the four disks having different compositions to observe the collapse of waveforms at the starting portion and the ending portion of writing in groove after overwriting for 100,000 times. The jitter measurements are also made. The results as shown in Table 2 are obtained.

It is known from these results that all of these four levels show good initial characteristics. Next, these materials are charged in an oven at 90° C. and 80% RH and kept for 500 hours. Thereafter, the specimens are returned to room temperature and are subjected to waveform observation. As a result, it is known that some show defects which are presumed to be attributed to the partial release of the constituting layers in the recording signals (burst defect). The results are shown in Table 2. As a result, it is apparent that $Al_2O_{1.5-2.8}$, show favorable characteristics from the durability point of view.

TABLE 2

| Composition of high hardness layer | Waveform collapse at start of writing | Waveform collapse at end of writing | Jitter (vs. window width) | Number of bursting defects (per 50 cm² of record region) | Hardness | Refraction index |
|---|---|---|---|---|---|---|
| $Al_2O_{1.2}$ | 6.4 μm | 1.4 μm | 9.4% | 1 | 1800 | 2.0 |
| $Al_2O_{1.6}$ | 6.2 μm | 1.2 μm | 9.5% | 0 | 1840 | 1.9 |
| $Al_2O_{2.7}$ | 5.9 μm | 1.3 μm | 9.4% | 0 | 1900 | 1.8 |
| $Al_2O_{3.0}$ | 6.0 μm | 1.0 μm | 9.0% | 2 | 1900 | 1.8 |

Example 15

Except that the four level high hardness layers of $AlN_{0.2}$, $AlN_{0.5}$, $AlN_{0.9}$, $AlN_{1.0}$, are made by using a mixed gas of Ar and $N_2$ by Al reactive sputtering, there are obtained the disks similar to those of Example 6. The composition ratios of Al to N are varied by changing the flow ratio of Ar to $N_2$. The compositions of the prepared high hardness layers are confirmed by NRA (Nuclear Reaction Analysis) process.

The determinations similar to those of Example 1 are given to the four disks having different compositions to observe the collapse of waveforms at the starting portion and the ending portion of writing in groove after overwriting for 100,000 times. The jitter measurements are also made. The results as shown in Table 3 are obtained.

It is known from these results that all of these four levels show good initial characteristics. Next, these materials are charged in an oven at 90° C. and 80% RH and kept for 500 hours. Thereafter, the specimens are returned to room temperature and are subjected to waveform observation. As a result, it is known that some show defects which are presumed to be attributed to the partial release of the constituting layers in the recording signals (burst defect). The results are shown in Table 3. From these results, it is apparent that $Al_2N_{0.5-0.9}$, show favorable characteristics from the durability point of view.

similar to those of Example 6. The composition ratios of Zr to O are varied by changing the flow ratio of Ar to $O_2$. The compositions of the prepared high hardness layers are confirmed by RBS (Rutherford Backward Scattering) process.

The determinations similar to those of Example 1 are given to the four disks having different compositions to observe the collapse of waveforms at the starting portion and the ending portion of writing in groove after overwriting for 100,000 times. The jitter measurements are also made. The results as shown in Table 4 are obtained.

It is known from these results that all of these four levels show good initial characteristics. Next, these materials are charged in an oven at 90° C. and 80% RH and kept for 500 hours. Thereafter, the specimens are returned to room temperature and are subjected to waveform observation. As a result, it is known that some show defects which are presumed to be attributed to the partial release of the constituting layers in the recording signals (burst defect). The results are shown in Table 4. From these results, it is apparent that $ZrO_{0.8-1.8}$, show favorable characteristics from the durability point of view.

TABLE 3

| Composition of high hardness layer | Waveform collapse at start of writing | Waveform collapse at end of writing | Jitter (vs. window width) | Number of bursting defects (per 50 cm² of record region) | Hardness | Refraction index |
|---|---|---|---|---|---|---|
| $AlN_{0.2}$ | 4.8 μm | 2.0 μm | 10.1% | 1 | 1400 | 2.2 |
| $AlN_{0.5}$ | 4.1 μm | 2.1 μm | 10.2% | 0 | 1450 | 2.0 |
| $AlN_{0.9}$ | 4.1 μm | 2.2 μm | 9.7% | 0 | 1500 | 1.9 |
| $AlN_{1.0}$ | 4.0 μm | 2.0 μm | 10.0% | 2 | 1500 | 1.9 |

Example 16

Except that the four level high hardness layers of $ZrO_{0.5}$, $ZrO_{0.9}$, $ZrO_{1.8}$, $ZrO_{2.0}$, are made by using a mixed gas of Zr and $O_2$ by Zr reactive sputtering, there are obtained the disks

TABLE 4

| Composition of high hardness layer | Waveform collapse at start of writing | Waveform collapse at end of writing | Jitter (vs. window width) | Number of bursting defects (per 50 cm² of record region) | Hardness | Refraction index |
|---|---|---|---|---|---|---|
| $ZrO_{0.2}$ | 4.2 μm | 2.1 μm | 10.2% | 2 | 1450 | 2.2 |
| $ZrO_{0.9}$ | 4.2 μm | 1.9 μm | 10.5% | 0 | 1500 | 2.1 |
| $ZrO_{1.8}$ | 4.3 μm | 2.0 μm | 10.0% | 0 | 1600 | 2.0 |
| $ZrO_{2.0}$ | 4.0 μm | 2.0 μm | 10.0% | 1 | 1600 | 2.0 |

Example 17

Si$_3$N$_4$ target is sputtered to form a high hardness layer of 25 nm (Knoop hardness=1900) on a substrate. Next, by simultaneously sputtering the Si$_3$N$_4$ target and ZnS—SiO$_2$ 20 mol % target, 20 nm of a mixed layer of high hardness layer material and a first dielectric layer material is formed. At this time, the power ratio to be supplied to the Si$_3$N$_4$ target and ZnS—SiO$_2$ 20 mol % target is continuously changed linearly, so that the composition of the mixed layer changes continuously between the critical surface on the high hardness layer and the critical surface on the first dielectric layer side. Further, by sputtering the ZnS—SiO$_2$ 20 mol % target, 50 nm of the second dielectric layer is formed.

Continuously, an alloy target comprising Ge, Sb, and Te is sputtered to give a recording layer comprising the composition of Ge$_{0.85}$Sb$_{0.279}$Te$_{0.536}$ with the thickness of 19 nm. Further, in the same manner as in the above second dielectric layer, the second dielectric layer is formed by 16 nm, on which an Al$_{98.1}$Hf$_{1.7}$Pd$_{0.2}$ alloy is sputtered to form a reflective layer having film thickness of 150 nm to give the optical recording medium of the present invention. Besides the above, the disk is similar to that of Example 1.

Next, the above product is contained in an oven at 90° C. and 80% RH and kept for 200 hours. As a result, no release is observed at all.

On practice of determinations similar to those of Example 1, the collapses of waveforms at the starting portion and the ending portion of writing in groove after overwriting for 100,000 times are confirmed to be sufficiently small at 5 μm and 0 μm, respectively. The jitter is 10.0% of the window width, which is practically sufficiently small.

Example 18

Except that SiO$_2$ target is used in place of Si$_3$N$_4$ target and the thickness ratio of high hardness layer/mixed layer of high hardness layer material and first dielectric layer material/first dielectric layer is 20 nm/80 nm/20 nm, an optical recording medium similar to that of Example 17 is obtained.

In the same manner as in Example 17, the above optical recording medium is contained in an oven at 90° C. and 80% RH and kept for 200 hours. As a result, no release is observed at all.

On practice of determinations similar to those of Example 1, the collapses of waveforms at the starting portion and the ending portion of writing in groove after overwriting for 100,000 times are confirmed to be sufficiently small at 10 μm and 3 μm, respectively. The jitter is 10.0% of the window width, which is practically sufficiently small.

Example 19

Except that the thickness of the high hardness layers is made 5 nm, 25 nm, and 120 nm, similar disks to those of Example 1 are made. On practice of determinations similar to those of Example 1, the collapses of waveforms at the starting portion and the ending portion of writing in groove after overwriting for 100,000 times are observed. Also, jitter measurements are made. As a result, the results as shown in Table 5 are obtained.

TABLE 5

| Thickness of high hardness layer | Thickness of first dielectric layer | Waveform collapse at start of writing | Waveform collapse at end of writing | Jitter (vs. window width) |
|---|---|---|---|---|
| 5 nm | 95 nm | 100 μm | 20 μm | 13.0% |
| 25 nm | 95 nm | 25 μm | 10 μm | 11.5% |
| 35 nm | 95 nm | 6 μm | 2 μm | 9.6% |
| 120 nm | 95 nm | 6 μm | 10 μm | 13.2% |

In the above results, the reason why the jitter of the high hardness layer having the thickness of 120 nm is slightly inferior is due to the generation of burst by repeated recording. From the above results, it has been clarified that with the high hardness layer thickness thinner than the first dielectric layer by more than 10 nm, good characteristics are shown in repetition durability.

Example 20

Except that a polycarbonate substrate with spiral groove having a shape as shown in Table 10 is used as a substrate, there are made the optical recording media similar to those of Examples 1, 6 and 7. On determinations in the same manner as in Example 1, the collapses of waveforms at the starting portion and the ending portion of writing in groove after overwriting for 100,000 times are observed. The jitter measurements are also made. As a result, favorable results are obtained in all disks, as shown in Table 6.

Further, on similar measurements with land, favorable results are obtained as with the groove. The results are shown in Table 7.

TABLE 6

| Film constitution | Waveform collapse at start of writing (groove) | Waveform collapse at end of writing (groove) | Jitter (groove) (vs. window width) |
|---|---|---|---|
| Same as Example 1 | 5 μm | 5 μm | 10.0% |
| Same as Example 6 | 4 μm | 0 μm | 9.5% |
| Same as Example 7 | 6 μm | 1 μm | 10.0% |

TABLE 7

| Film constitution | Waveform collapse at start of writing (land) | Waveform collapse at end of writing (land) | Jitter (land) (vs. window width) |
|---|---|---|---|
| Same as Example 1 | 10 μm | 0 μm | 9.0% |
| Same as Example 6 | 15 μm | 7 μm | 10.0% |
| Same as Example 7 | 6 μm | 1 μm | 9.5% |

Example 21

Except that a polycarbonate substrate with spiral groove having a shape as shown in Table 10 is used as a substrate, there are made the optical recording media similar to those of Examples 1, 6 and 7. On determinations in the same manner as in Example 1, the collapses of waveforms at the starting portion and the ending portion of writing in groove after overwriting for 100,000 times are observed. The jitter measurements are also made. As a result, favourable results are obtained in all disks, as shown in Table 8.

Further, on similar measurements with land, favourable results are obtained as with the groove. The results are shown in Table 9.

TABLE 8

| Film constitution | Waveform collapse at start of writing (groove) | Waveform collapse at end of writing (groove) | Jitter (groove) (vs. window width) |
|---|---|---|---|
| Same as Example 1 | 8 μm | 3 μm | 10.2% |
| Same as Example 6 | 5 μm | 2 μm | 9.7% |
| Same as Example 7 | 8 μm | 4 μm | 10.1% |

TABLE 9

| Film constitution | Waveform collapse at start of writing (land) | Waveform collapse at end of writing (land) | Jitter (land) (vs. window width) |
|---|---|---|---|
| Same as Example 1 | 12 μm | 4 μm | 9.2% |
| Same as Example 6 | 18 μm | 7 μm | 9.9% |
| Same as Example 7 | 8 μm | 6 μm | 9.5% |

Example 22

Except that a polycarbonate substrate with spiral groove having a shape as shown in Table 10 is used as a substrate, there is made an optical recording medium similar to that of Examples 1. On determinations in the same manner as in Example 1, the collapses of waveforms at the starting portion and the ending portion of writing are similar to those of Example 1, but the jitter of groove after overwriting for 100,000 times are observed to be large at 15%.

Example 23

Except that the thickness of the second dielectric layer is made 5 nm, and further a high hardness layer comprising $SiO_2$ (thickness 22 nm–Knoop hardness=550) is provided between the second dielectric layer and the reflective layer, a disk is made in the same manner as in Examples 1 to obtain a disk comprising 6 layers in total. On determinations on the disk in the same manner as in Example 1, the collapses of waveforms at the starting portion and the ending portion of writing are similar to those of Example 1, but the jitter of groove after overwriting for 100,000 times are observed to be large at 15%.

Example 24

Except that a polycarbonate substrate with spiral groove having a shape as shown in Table 10 is used as a substrate, there is made an optical recording medium similar to that of Examples 1. On determinations in the same manner as in Example 1, the collapses of waveforms at the starting portion and the ending portion of writing are similar to those of Example 1, but the jitter of groove after overwriting for 100,000 times is observed to be large at 14%.

Comparative Example 1

Except the omission of the high hardness layer, the same disk as in Example 1 is obtained. On determinations in the same manner as in Example 1, the jitter of groove after overwriting for 100,000 times is large at 14%, and further, on observation of the collapses of waveforms at the starting portion and the ending portion of writing, the values are large at 200 μm and 50 μm, respectively, and it is known that accurate reproduction of data is difficult.

Also, the jitter of land after recording for 100,000 times is further large at 25% of window width. On observation of the collapses of waveforms at the starting portion and the ending portion of writing, the values are large at 400 μm and 100 μm, respectively, and it is known that no accurate reproduction of data can be made.

Comparative Example 2

Except that ZnS is made instead of the high hardness layer of Example 1, a disk similar to that of Example 1 is made. The Knoop hardness of ZnS is 200.

On determinations of the disk in the same manner as in Example 1, the jitter of groove after overwriting for 100,000 times is large at 18% of the window width, and further, on observation of the collapses of waveforms at the starting portion and the ending portion of writing, the values are large at 150 μm and 100 μm, respectively, and it is found that accurate reproduction of data is difficult.

Comparative Example 3

Except that the thickness of the second dielectric layer is set to be 5 nm, and further a high hardness layer comprising $SiO_2$ is provided (thickness 22 nm) between the second dielectric layer and the reflective layer, a disk similar to that of Comparative Example 1 is made.

On determinations of the disk in the same manner as in Example 1, the jitter of groove after overwriting for 100,000 times is large at 20% of the window width, and further, on observation of the collapses of waveforms at the starting portion and the ending portion of writing, the values are large at 180 μm and 30 μm, respectively, and it is found that accurate reproduction of data is difficult.

Comparative Example 4

Except that a polycarbonate substrate with spiral groove having a shape as shown in Table 10 is used as a substrate, there is made a disk similar to that of Comparative Examples 1. On determinations in the same manner as in Example 1, the jitter of groove after overwriting for 100,000 times is at 16% of the window width, being larger than at of Comparative Example 1. Further, on observation of the collapses of waveforms at the starting portion and the ending portion of writing, the results obtained are similar to those of Comparative Example 1, and it is found that accurate reproduction of data is difficult.

TABLE 10

|  | Examples 1–19,13 Comparative Examples 1–3 | Example 20 Comparative Example 4 | Example 21 | Example 22 | Example 24 |
|---|---|---|---|---|---|
| Groove depth (nm) | 72 | 70 | 68 | 60 | 68 |
| Inclination between guide grooves | 0.35 | 0.35 | 0.7 | 0.1 | 0.35 |
| Track pitch (μm) | 1.48 | 1.48 | 1.48 | 1.49 | 1.48 |
| Half width of groove of substrate (μm) | 0.74 | 0.76 | 0.74 | 0.75 | 0.73 |

TABLE 10-continued

| | Examples 1–19,13 Comparative Examples 1–3 | Example 20 Comparative Example 4 | Example 21 | Example 22 | Example 24 |
|---|---|---|---|---|---|
| Half width of land of substrate (μm) | 0.74 | 0.72 | 0.74 | 0.74 | 0.75 |
| Width of inclined part between land and groove (μm) | 0.16 | 0.16 | 0.08 | 0.48 | 0.16 |
| Width of wobble (μm) | No wobble | 0.03 | 0.05 | 0.08 | 0.16 |

EFFECTS OF THE INVENTION

According to embodiments of the present invention, the following effects may be obtainable:

(1) Even after repetition of recording and erasing many times, there may be reduced degradation of the sector at the starting portion and the ending portion of writing.
(2) Even after repetition of recording and erasing many times, the jitter characteristics may be good.
(3) Even in the land groove recording, repetition characteristics may be good.
(4) The medium can be easily made by sputtering process.

What is claimed is:

1. An optical recording medium having a recording layer capable of undergoing a phase change between an amorphous phase and a crystalline phase upon irradiation for recording and erasing of information, said medium comprising:
    a substrate,
    a high hardness layer,
    a first dielectric layer directly on the hardness layer,
    a recording layer,
    a second dielectric layer and
    a reflective layer, in this order on a substrate,
    wherein
        the hardness of the high hardness layer is greater than that of the first dielectric layer, and
        the thickness of the second dielectric layer is from 3 to 50 nm.

2. An optical recording medium according to claim 1, wherein the recording layer comprises a land region and a groove region for recording information.

3. An optical recording medium according to claim 2, wherein the inclination of a slope portion between a groove and a land is from 0.15 to 1.8.

4. An optical recording medium according to claim 2, wherein the width of an inclined part between a land and a groove is 3 to 25% of the track pitch.

5. An optical recording medium according to claim 2, wherein a groove has a depth corresponding to an optical path length of 1/7 to 1/5 of the wavelength of the reproduction light.

6. An optical recording medium according to claim 2, wherein a groove and a land are wobbled, and the widths of said wobble are respectively 1 to 10% of the widths of said groove and said land.

7. An optical recording medium according to claim 1, wherein the optical recording medium is a recorded medium having marks that are recorded in a mark length format.

8. An optical recording medium according to claim 1, wherein at least either the refractive index of the high hardness layer or the refractive index of the first dielectric layer is more than 1.6 in the laser wavelength to be used for erasing the record.

9. An optical recording medium according to claim 1, wherein the difference between the refractive index of the second dielectric layer and the refractive index of the high hardness layer in the laser wavelength to be used for erasing the record is −0.2 to 0.2, or the difference between the refractive index of the second dielectric layer and the refractive index of the first dielectric layer is −0.2 to 0.2.

10. An optical recording medium according to claim 1, wherein the thermal conductivity of the high hardness layer is greater than the thermal conductivity of the first dielectric layer.

11. An optical recording medium according to claim 1, wherein the refractive index of the high hardness layer is smaller than the refractive index of the first dielectric layer.

12. An optical recording medium according to claim 1, wherein the thickness of the high hardness layer is 10 to 100 nm.

13. An optical recording medium according to claim 12, wherein the thickness of the high hardness layer is 25 nm or more.

14. An optical recording medium according to claim 1, wherein the high hardness layer has a Knoop hardness of 450 kg/mm$^2$ or more.

15. An optical recording medium according to claim 1, wherein the sum of the thicknesses of the high hardness layer and the first dielectric layer is 10 to 500 nm, and the thickness of the high hardness layer is thinner than the thickness of the first dielectric layer.

16. An optical recording medium according to claim 15, wherein the sum of the thicknesses of the high hardness layer and the first dielectric layer is 80 to 200 nm.

17. An optical recording medium according to claim 1, wherein the coefficient of thermal expansion of the high hardness layer is lower than the coefficient of thermal expansion of the first dielectric layer.

18. An optical recording medium according to claim 1, wherein the thickness of the recording layer is 5 to 40 nm.

19. An optical recording medium according to claim 1, having a mixed layer of the high hardness layer material and the first dielectric layer material provided between the high hardness layer and the first dielectric layer.

20. An optical recording medium according to claim 1, wherein the first dielectric layer and the second dielectric layer are independently selected from mixed films of ZnS and $SiO_2$ or the mixed films having ZnS and $SiO_2$ as the main components, and the content of $SiO_2$ is 15 to 35 mol %.

21. An optical recording medium according to claim 1, wherein the high hardness layer is SiOx ($1 \leq x \leq 2$) film or a mixed film having the same as the main component.

22. An optical recording medium according to claim 1, wherein the high hardness layer is $Si_3N_{4-x}$ ($0 \leq x \leq 2$) film or a mixed film having the same as the main component.

23. An optical recording medium according to claim 22, wherein the high hardness layer is $Si_3N_{4-x}$ ($0.5 \leq x \leq 1.5$) film or a mixed film having the same as the main component.

24. An optical recording medium according to claim 1, wherein the high hardness layer is $Ta_2O_{5-x}$ ($0 \leq x \leq 1$) film or a mixed film having the same as the main component.

25. An optical recording medium according to claim 1, wherein the high hardness layer is $Al_2O_{3-x}$ ($0 \leq x \leq 2$) film or a mixed film having the same as the main component.

26. An optical recording medium according to claim 25, wherein the high hardness layer is $Al_2O_{3-x}$ ($0.2 \leq x \leq 1.5$) film or a mixed film having the same as the main component.

27. An optical recording medium according to claim 1, wherein the high hardness layer is AlNx ($0.2 \leq x \leq 1$) film or a mixed film having the same as the main component.

28. An optical recording medium according to claim 27, wherein the high hardness layer is AlNx ($0.5 \leq x \leq 0.9$) film or a mixed film having the same as the main component.

29. An optical recording medium according to claim 1, wherein the high hardness layer is ZrOx ($0.5 \leq x \leq 2$) film or a mixed film having the same as the main component.

30. An optical recording medium according to claim 29, wherein the high hardness layer is ZrOx ($0.8 \leq x \leq 1.8$) film or a mixed film having the same as the main component.

31. An optical recording medium having a recording layer capable of undergoing a phase change between an amorphous phase and a crystalline phase upon irradiation for recording and erasing of information, said medium comprising:

a substrate, a high hardness layer, a first dielectric layer directly on the hardness layer, a recording layer, a second dielectric layer and a reflective layer, in this order on a substrate, wherein the hardness of the high hardness layer is greater than that of the first dielectric layer, the thickness of the second dielectric layer is from 3 to 50 nm, and the high hardness layer is substantially transparent at a recording light wave length.

32. An optical recording medium according to claim 1, wherein the melting point of the high hardness layer is higher than a temperature at which said recording layer undergoes said phase change between the amorphous phase and the crystalline phase.

33. A method for manufacturing an optical recording medium according to claim 1, wherein the high hardness layer is formed by a reactive sputtering process.

* * * * *